US011923593B2

(12) United States Patent
Scott et al.

(10) Patent No.: US 11,923,593 B2
(45) Date of Patent: Mar. 5, 2024

(54) INTEGRATED RADIO FREQUENCY TRANSMITTER AND MODEM

(71) Applicant: Hughes Network Systems, Germantown, MD (US)

(72) Inventors: Michael Scott, Germantown, MD (US); Jack Lundstedt, Germantown, MD (US); Walter Kepley, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/664,130

(22) Filed: May 19, 2022

(65) Prior Publication Data

US 2023/0073425 A1 Mar. 9, 2023

Related U.S. Application Data

(60) Provisional application No. 63/242,453, filed on Sep. 9, 2021, provisional application No. 63/242,456, filed on Sep. 9, 2021.

(51) Int. Cl.

| | |
|---|---|
| ***H01Q 1/02*** | (2006.01) |
| ***H01Q 1/12*** | (2006.01) |
| ***H01Q 1/24*** | (2006.01) |

(52) U.S. Cl.

CPC ............... *H01Q 1/02* (2013.01); *H01Q 1/125* (2013.01); *H01Q 1/246* (2013.01)

(58) Field of Classification Search

CPC .......... H01Q 1/02; H01Q 1/246; H01Q 1/247; H01Q 1/125; H01Q 1/44; H01Q 1/50; H01Q 3/005; H01Q 3/02-10; H01Q 19/19; H04B 7/155; H04B 7/18517

See application file for complete search history.

(56) References Cited

U.S. PATENT DOCUMENTS

2012/0320525 A1 12/2012 Vedel et al.

FOREIGN PATENT DOCUMENTS

| | | |
|---|---|---|
| CN | 210428221 U | 4/2020 |
| GB | 2540775 A | 2/2017 |

OTHER PUBLICATIONS

International Search Report for PCT Application No. PCT/US2022/076002.

ITU-T Study Group 15: "Telecommunication outside plants in areas frequently exposed to natural disasters", ITU Handbook, No. RGQ22-1/2/32-E, May 1, 2013 (May 1, 2013), pp. 1-149, XP044072231, Geneva [retrieved on May 1, 2013].

Kodheli Oltjon et al: "Satellite Communications in the New Space Era: A Survey and Future Challenges", IEEE Communications Surveys & Tutorials, IEEE, USA, vol. 23, No. 1, Oct. 1, 2020 (Oct. 1, 2020), pp. 70-109, XP011839564, DOI: 10.1109/COMST.2020.3028247 [retrieved on Feb. 23, 2021].

*Primary Examiner* — Robert Karacsony

(74) *Attorney, Agent, or Firm* — Capitol City TechLaw; Jasbir Singh

(57) ABSTRACT

An antenna pedestal including: a body having an inner cavity defined by a wall and a top ledge; a Heating, ventilation, and air conditioning (HVAC) system to provide climate control for the inner cavity; and a door to access the inner cavity of the body, wherein the top ledge supports a mechanical steering.

19 Claims, 5 Drawing Sheets

INTEGRATED RADIO FREQUENCY TRANSMITTER AND MODEM

CROSS-REFERENCE TO RELATED APPLICATIONS AND INCORPORATION BY REFERENCE

The present application claims the benefit under 35 U.S.C. 119(e) of U.S. Provisional Application Ser. No. 63/242,453, filed Sep. 9, 2021; and 35 U.S.C. 119(e) of U.S. Provisional Application Ser. No. 63/242,456, filed Sep. 9, 2021, all of which are incorporated herein by reference in their entireties.

FIELD

The present teachings disclose a field deployable satellite gateway. The gateway uses high density and performance satellite modems and LAN/WAN equipment co-located with an antenna and an antenna hub. The gateway equipment is installed in a pedestal of the antenna. The gateway equipment has a small footprint and provides increased capacity in a dense configuration.

BACKGROUND

Typically satellite gateway equipment is installed at a data center collocated with a microwave/RF antenna. A tracking antenna and an antenna hub (includes RF (Radio Frequency) converters and amplifiers) are provided in a self-contained unit that is referred to as the RF Terminal (RFT). The RF Gateway includes Modulators, Demodulators and LAN/WAN equipment typically installed in the data center and cabled up to the RFT using an Inter Facility Link (IFL) cabling. The IFL has to be tuned, and long runs of the IFL pose unique challenges.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a green field satellite gateway. The satellite gateway (RF gateway) includes high density and performance satellite modems and LAN/WAN equipment that is co-located with an RFT. In some embodiments, the RF gateway equipment is installed in a pedestal of the antenna used for the RFT.

One general aspect includes an antenna pedestal including: a body having an inner cavity defined by a wall and a top ledge; a Heating, ventilation, and air conditioning (HVAC) system to provide climate control for the inner cavity; and a door to access the inner cavity of the body, wherein the top ledge supports a mechanical steering.

Implementations may include one or more of the following features.

The antenna pedestal including a ceiling including an access panel to access a mechanical steering, wherein the ceiling covers the inner cavity.

The antenna pedestal including a modem disposed in the inner cavity; and a fiber interface disposed in the inner cavity to connect the modem to a data center.

The antenna pedestal including an equipment rack disposed in the inner cavity to house the modem.

The antenna pedestal including an edge router disposed in the inner cavity, wherein the edge router includes the fiber interface connecting the modem to the data center.

The antenna pedestal including the data center is separated from the data center by a distance of at least one kilometer.

The antenna pedestal where the data center is separated from the data center by a distance of at least fifty kilometers.

The antenna pedestal where the modem includes modems operating in the Ka, V and Q bands.

The antenna pedestal including an antenna hub; and an Inter-Facility Link (IFL) to electrically connect the modem and the antenna hub.

The antenna pedestal including a reflector; and a mechanical steering to steer the reflector, wherein the mechanical steering is attached to the top ledge.

The antenna pedestal where the IFL has a length less than or equal to 20 meters (m).

The antenna pedestal where the IFL has a length less than or equal to 50 meters (m).

The antenna pedestal including an antenna hub including an IFL interface attached to the reflector, wherein the IFL interface connects the antenna hub to a modem.

The antenna pedestal including one or more of a Radio Frequency Gateway (RFGW) server.

Additional features will be set forth in the description that follows, and in part will be apparent from the description, or may be learned by practice of what is described.

DRAWINGS

To describe the way the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
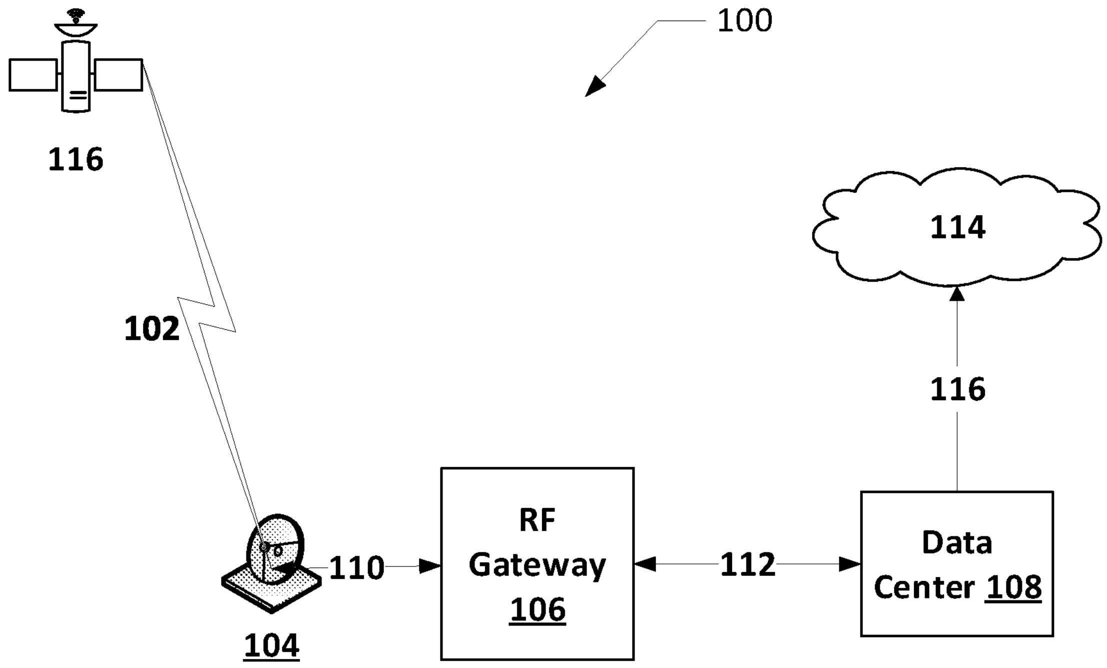
FIG. 1 illustrates a satellite feeder link system in one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose a multibeam satellite system that can achieve orthogonality between spatially multiplexed signals when operating in line-of-sight (LOS) channels, using satellite links utilizing a large frequency spectrum. By utilizing a larger frequency spectrum, a capacity/bandwidth of satellite links from a gateway to a satellite can be increased.

The present teachings disclose a green field satellite gateway. The satellite gateway (RF gateway) includes high density and performance satellite modems and LAN/WAN equipment that is co-located with an RFT. In some embodiments, the RF gateway equipment is installed in a pedestal of the antenna used for the RFT. This reduces operational expenses by combining these two entities, without needing a data center installed along with an RFT.

The RF gateway equipment has a small footprint and provides increased capacity in a dense configuration. The RF gateway is connected to a data center by a fiber link, while the RFT and the RF gateway are connected via an IFL. The fiber link advantageously permits installations of a gateway remote from the data center, while reducing the IFL length. The footprint at an installation site is RF in/out to 100 G fiber interface and contained with the support structure for an antenna while integrating the modulators/demodulators into an antenna pedestal.

The long fiber link runs permit use of green field RFT and RF gateway installations. The green field installation is usable at remote locations, merely with a power source and a fiber link, without need for extensive on-site support. This configuration advantageously supports multiple-in multiple-out (MIMO) configurations to provide robust and higher throughput satellite uplinks and downlinks.

The present teachings are applicable to a Geosynchronous Earth Orbit (GEO) and non-GEO satellite systems used with satellite bent-pipe architectures.

FIG. 1 illustrates a satellite feeder link system in one embodiment.

FIG. 1 illustrates a system 100 (or satellite feeder link system 100) including a satellite link 102 (wireless), an RFT 104 (Radio Frequency Terminal), an RF gateway 106, an Interfacility Link (IFL 110), a fiber link 112 and a data center 108. The data center may be connected to the Internet 114. The RFT 104 may communicate with a satellite 116 via the satellite link 102. When the satellite link 102 communicates from the RFT 104 to the satellite 116, it is referred to as an uplink. When the satellite link 102 communicates from the satellite 116 to the RFT 104, it is referred to as a downlink.

The RFT 104 includes an antenna system and associated RF electronics (typically housed in a hub located near a reflector). This includes electronics to provide a Tx path (frequency conversion from an Intermediate Frequency (IF) to RF and amplification) and Rx path (Low noise RF amplification followed by frequency conversion from RF to IF) as well as other electronics. The RFT 104 includes a a reflector, which may collect radio waves from the reflector and convert the collected radio waves to a signal for the Rx path sent through the IFL 110 to the RF gateway 106. This conversion of RF to a lower block of IF–, allows the signal to be carried, e.g., via a wired connection such as the IFL 110, to the RF gateway 106. Typically, the RF gateway includes baseband modems, data processing, and a networking interface to data center 108 via the fiber link 112. In some embodiments, the RFT 104 and the RF gateway 106 may be collocated (for example, within an antenna structure), while the data center 108 may be remote, for example, 10, 20, 100 or the like kilometers away.

The RFT 104 typically includes a sender antenna configured to send radio frequency waves to a satellite. The RFT 104 is electrically wired to the RF gateway 106 to receive an outgoing RF signal via the IFL 110 and to send the RF signal via the satellite link 102 to the satellite 116. In the present context, a satellite link is a wireless communication between the RF gateway 106, the RFT 104 and satellite 116. Satellite link 102 is typically established upon configuring a modem modulator, demodulator, encoder, and/or decoder.

The RF gateway 106 may provide pre-interference interference processing for a Tx signal prior to transmitting. The RF gateway 106 may provide post-interference interference processing for a Rx signal upon receipt.

The data center 108 may be connected to the RF gateway 106 via a fiber link. The data center 108 may provide access to the Internet, bandwidth allocation, network address translation, system management, diversity management and the like for terminals (not shown) connected via a wireless link (not shown) from the satellite to the terminals, and the Internet 114. The data center 108 may be connected to multiple Points of Presence (POPs) to access the Internet 114. The data center 108 may service multiple RF gateways. The data center 108 may serve all or some of the RF gateways of a system 100. The RF gateway 106 typically resides in a collocated data center 108. As such, the fiber link 112 would be a cross-connect or short run connection within the data center 108. In some embodiments, the RF gateway 106 may not be collocated with the RF gateway 106 and the fiber link 112 can be significant distance.

Figure 2A:
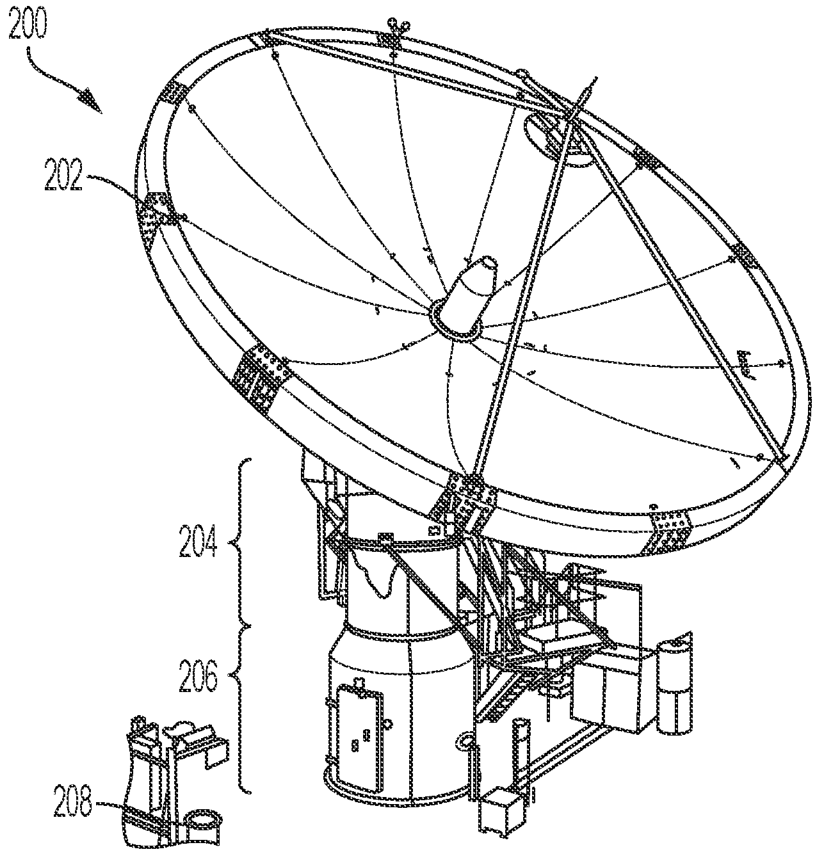
FIG. 2A and FIG. 2B illustrate a steerable antenna comprising an antenna pedestal according to various embodiments.
Figure 2B:
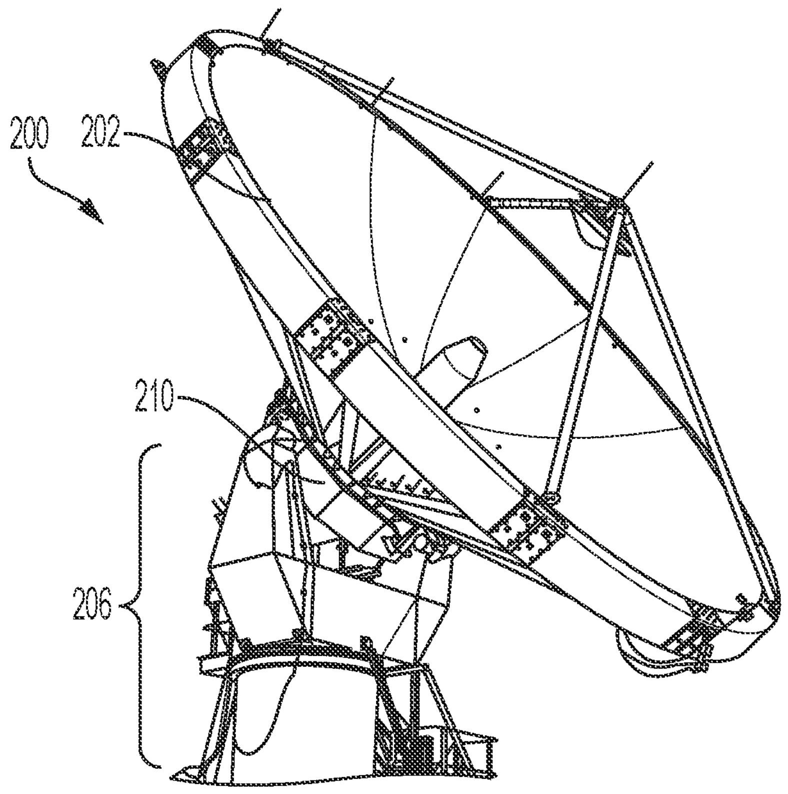

FIG. 2A and FIG. 2B illustrate a steerable antenna comprising an antenna pedestal according to various embodiments.

A steerable 200 may include a reflector 202, a mechanical steering 204, an antenna pedestal 206, a HVAC system 208 and an antenna hub 210. The HVAC system 208 may include a chiller, a buffer tank, a dry cooler, a pump, a heat exchanger and the like.

Figure 3A:
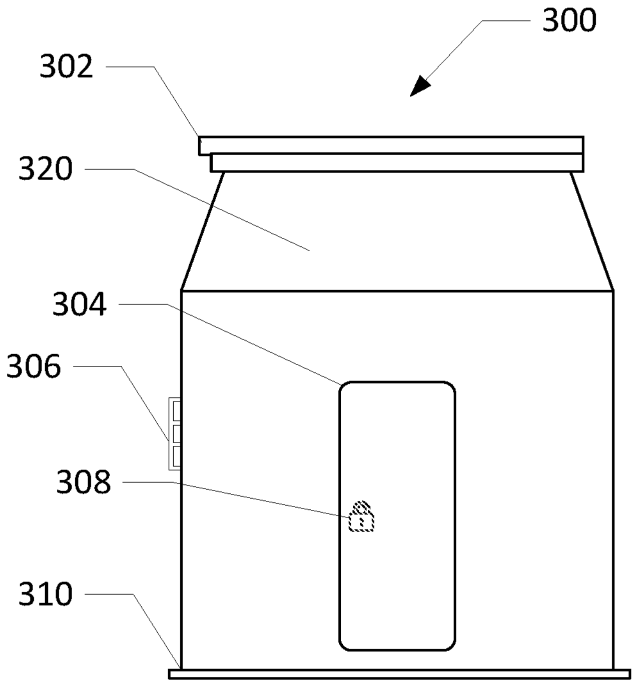
FIG. 3A and FIG. 3B illustrate an antenna pedestal according to various embodiments.
Figure 3B:
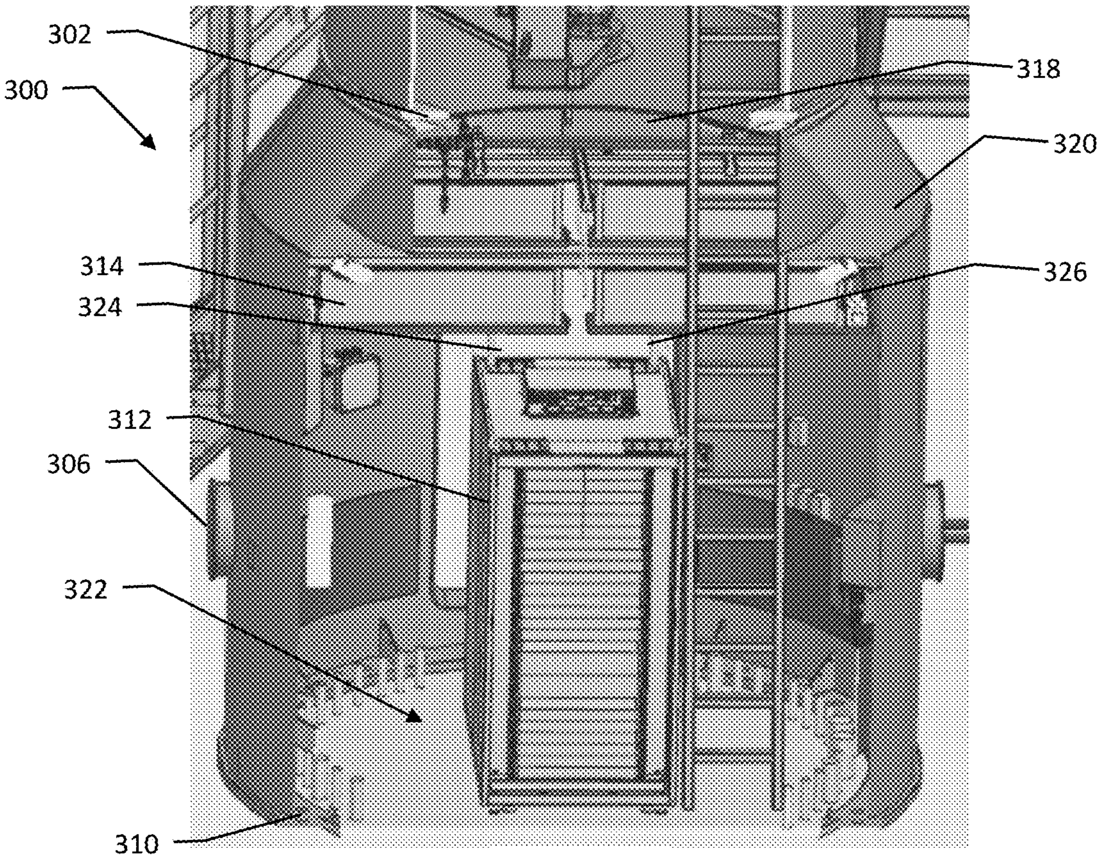

FIG. 3A and FIG. 3B illustrate an antenna pedestal according to various embodiments.

An antenna pedestal 300 may include a wall 320 between a top ledge 302 and a bottom ledge 310. The wall 320 may define an inner cavity 322. A door 304 and a window/port 306 may be disposed in the wall 320. A lock 308, possible a remote-controlled electronic lock, may be disposed in the door 304. A mechanical steering (see FIG. 2B) may be supported on the top ledge 302. The joining of the mechanical steering with the antenna pedestal 300 may be made water-tight and attached to the antenna pedestal 300 by fastening means such as bolts and sealing means such as gaskets. The antenna pedestal 300 may be supported by a concrete pad (see FIG. 2A). The joining of the concrete pad with the antenna pedestal 300 may be made water-tight and attached to the antenna pedestal 300 by fastening means such as bolts and sealing means such as gaskets.

The inner cavity 322 may be climate-controlled using a heat exchanger 314 (or the like) of an HVAC system. The inner cavity 322 may be capped by a ceiling 318. An access panel (not shown but implied by a staircase illustrated in FIG. 3B and extending up from the concrete pad) to access an interior of the mechanical steering may be provided in the ceiling 318.

A equipment rack 312 may be disposed in the inner cavity 322. Various hardware components may be disposed in the equipment rack 312. Equipment in the equipment rack 312 may be connected to an antenna hub (see FIG. 2B) via an IFL 324. Equipment in the equipment rack 312 may be connected to a data center (see FIG. 1) via a fiber link 326. The equipment rack 312 may be in an industry standard computer rack. Equipment in the equipment rack 312 may include RF gateway servers, LAN/WAN equipment, optical switches, modems (to/from an IF to RF), management and control (M&C) hardware, and the like.

In some embodiments, the antenna pedestal may be partially shaped as a cylinder having a 102-inch diameter base. HVAC components, and space for maintenance personnel to operate. In some embodiments, the antenna pedestal may have two doors, namely, a front and rear access door. The top ledge 302 may accommodate a mechanical steering including a bearing assembly and yoke support arms. For example, the bearing assembly may have a 75" diameter bearing asse and provide movement of the reflector in Azimuth (East/West). The yoke support arms of the mechanical steering may hold the reflector to adjust an elevation angle for a turning movement. For example, the yoke arm assembly may be moved by a jack screw to adjust the elevation angle (North/South) of the reflector.

The antenna pedestal 300 may be a weatherproof enclosure suitable for outdoor environment to house electronics. The antenna pedestal 300 may include an access panel to route cabling, for example, the IFL, between RF gateway equipment in the antenna pedestal 300 to the mechanical steering in a protective conduit or equivalent. The antenna pedestal 300 may meet serviceability and maintainability requirements, and allow service personnel to move freely about the equipment rack 312. The antenna pedestal 300 may provide a means of providing temporary protection at the doorways from external precipitation and temperature variations during maintenance or service activities. The antenna pedestal 300 may provide a door locking system that permits opening/closing both externally and internally. It may be possible to remotely control the door locking system.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. An antenna pedestal comprising:
- a body having an inner cavity defined by a wall and a top ledge;
- a Heating, ventilation, and air conditioning (HVAC) system to provide climate control for the inner cavity;
- a door to access the inner cavity of the body;
- a modem disposed in the inner cavity; and
- a fiber interface disposed in the inner cavity to connect the modem to a data center, wherein the top ledge supports a mechanical steering.

2. The antenna pedestal of claim 1, further comprising a ceiling comprising an access panel to access a mechanical steering, wherein the ceiling covers the inner cavity.

3. The antenna pedestal of claim 1, further comprising an equipment rack disposed in the inner cavity to house the modem.

4. The antenna pedestal of claim 1, further comprising an edge router disposed in the inner cavity, wherein the edge router comprises the fiber interface connecting the modem to the data center.

5. The antenna pedestal of claim 1, wherein the antenna pedestal is separated from the data center by a distance of at least one kilometer.

6. The antenna pedestal of claim 1, wherein the antenna pedestal is separated from the data center by a distance of at least fifty kilometers.

7. The antenna pedestal of claim 1, wherein the modem comprises modems operating in the Ka, V and Q bands.

8. The antenna pedestal of claim 1, further comprising an antenna hub; and an Inter-Facility Link (IFL) to electrically connect the modem and the antenna hub.

9. The antenna pedestal of claim 8, further comprising a reflector; and a mechanical steering to steer the reflector, wherein the mechanical steering is attached to the top ledge.

10. The antenna pedestal of claim 8, wherein the IFL has a length less than or equal to 20 meters (m).

11. The antenna pedestal of claim 8, wherein the IFL has a length less than or equal to 50 meters (m).

12. The antenna pedestal of claim 1, further comprising a reflector; and a mechanical steering to steer the reflector, wherein the mechanical steering is attached to the top ledge.

13. The antenna pedestal of claim 12, further comprising an antenna hub comprising an IFL interface attached to the reflector, wherein the IFL interface connects the antenna hub to a modem.

14. An antenna pedestal comprising:
- a body having an inner cavity defined by a wall and a top ledge;
- a Heating, ventilation, and air conditioning (HVAC) system to provide climate control for the inner cavity;
- a door to access the inner cavity of the body; and
- one or more of a Radio Frequency Gateway (RFGW) server, wherein the top ledge supports a mechanical steering.

15. The antenna pedestal of claim 14, further comprising an edge router and a modem disposed in the inner cavity, wherein the edge router comprises a fiber interface to connect the modem to a data center.

16. The antenna pedestal of claim 14, wherein the antenna pedestal is separated from a data center by a distance of at least one kilometer.

17. The antenna pedestal of claim 14, further comprising an equipment rack disposed in the inner cavity.

18. The antenna pedestal of claim 14, further comprising a reflector; and a mechanical steering to steer the reflector, wherein the mechanical steering is attached to the top ledge.

19. The antenna pedestal of claim 18, further comprising a modem disposed in the inner cavity; an antenna hub comprising an IFL interface attached to the reflector; and an Inter-Facility Link (IFL) to electrically connect the modem and the antenna hub.

* * * * *